United States Patent
Eisele

(10) Patent No.: US 7,031,910 B2
(45) Date of Patent: Apr. 18, 2006

(54) METHOD AND SYSTEM FOR ENCODING AND ACCESSING LINGUISTIC FREQUENCY DATA

(75) Inventor: Andreas Eisele, Saarbruecken (DE)

(73) Assignee: Xerox Corporation, Stanford, CT (US)

( * ) Notice: Subject to any disclaimer, the term of this patent is extended or adjusted under 35 U.S.C. 154(b) by 906 days.

(21) Appl. No.: 09/977,304

(22) Filed: Oct. 16, 2001

(65) Prior Publication Data
US 2003/0074183 A1 Apr. 17, 2003

(51) Int. Cl.
*G06F 17/21* (2006.01)
*G06F 17/27* (2006.01)
*G06F 17/28* (2006.01)

(52) U.S. Cl. .................. 704/10; 704/9; 704/7
(58) Field of Classification Search ............... None
See application file for complete search history.

(56) References Cited

U.S. PATENT DOCUMENTS

| | | | |
|---|---|---|---|
| 5,450,598 A | | 9/1995 | Kaplan et al. |
| 5,640,487 A | * | 6/1997 | Lau et al. ............... 704/243 |
| 5,706,365 A | * | 1/1998 | Rangarajan et al. ....... 707/102 |
| 5,724,593 A | * | 3/1998 | Hargrave et al. ........... 704/7 |
| 5,754,847 A | | 5/1998 | Kaplan et al. |
| 6,092,038 A | * | 7/2000 | Kanevsky et al. ............ 704/9 |
| 6,173,298 B1 | * | 1/2001 | Smadja .................. 715/532 |
| 6,256,630 B1 | * | 7/2001 | Gilai et al. ............... 707/6 |
| 6,789,057 B1 | * | 9/2004 | Morimoto et al. ............ 704/2 |
| 2005/0055199 A1 | * | 3/2005 | Ryzchachkin et al. ........ 704/4 |

OTHER PUBLICATIONS

Philip Clarkson et al., "Statistical Language Modeling Using the CMU-Cambridge Toolkit", Proceedings ESCA Euro Speech, 1997.
Xerox Finite-State Tool described in Lauri Kartiunen, Tamas Gaal and Andre Kempe, "Xerox Finite-State Tool", Technical Report, Xerox Research Center Europe, Grenoble, France, Jun. 1997. Available on the Internet at http://www.xrce.xerox.com/research/mltt/fssoft/docs/fst-97/xfst97.html.

\* cited by examiner

*Primary Examiner*—Wayne Young
*Assistant Examiner*—Matthew J. Sked
(74) *Attorney, Agent, or Firm*—Oliff & Berridge, PLC

(57) ABSTRACT

Linguistic frequency data is encoded by identifying a plurality of sets of character strings in a source text, where each set comprises at least a first and a second character string. Frequency data is obtained for each set and stored at a memory position in a first memory array that is assigned to each first character string. A pointer pointing to a position in the first memory array that has been assigned to the corresponding first character string of the respective set and which has stored the frequency data of the respective set, is stored in a second memory array for each set comprising each character string that is a second character string. The encoded data is accessed by identifying regions in the memory arrays that are each assigned a search string and a pointer pointing to a position in the first memory array.

24 Claims, 6 Drawing Sheets

METHOD AND SYSTEM FOR ENCODING AND ACCESSING LINGUISTIC FREQUENCY DATA

BACKGROUND OF THE INVENTION

1. Field of the Invention

The invention generally relates to statistical language models and in particular to a compact representation of lexical information including linguistic frequency data.

2. Description of Related Art

Statistical language models are important prerequisites for many natural language processing tasks, such as syntactic parsing or coding of distorted natural language input. Tasks related to natural language processing include improved methods of optical character recognition that use statistical information on word co-occurrences to achieve reduced error rates via context-aware decoding. Other application areas are context-sensitive word sense disambiguation, expansion of acronyms, structural disambiguation, parsing with statistical models and text categorization or classification.

In the context of such applications, there is a need to represent considerable amounts of lexical information, often in form of frequencies of joint occurrences of word pairs and n-tuples. Many natural language processing tasks require the estimation of linguistic probabilities, i.e. the probability that a word appears in a certain context. Typically, such context also contains lexical information so that the probability needs to be estimated that an unknown word that is supposed to be in a given relation to a given word will turn out to be identical to a certain other word. Quite often, relevant probability models involve more than two words, such as the classic trigram models in speech recognition, where the probability of a word is conditioned on the two words on the left side of it.

Research on language modeling was so far mostly focused on the task of speech recognition. In such a mainly interactive application, it seems justifiable to restrict the attention to some 10,000 of the most frequent words in the given application domain and to replace words that are too rare by some generic placeholder. However, as the attention shifts towards applications with larger vocabulary size, such as lexical language modeling for optical character recognition, stochastic parsing and semantic disambiguation for open domains, or modeling the word usage in the Internet, it becomes more important to be able to push the size limit of the vocabulary that can be incorporated in a stochastic model.

The use of such models requires the storage of very many possible tuples of values together with the frequencies in which these tuples appeared in the training data. To make the use of such models practical, the storage scheme should allow retrieval of the frequency associated with a given tuple in near constant time.

Whereas a fairly straightforward encoding in standard data structures, such as hash-tables is sufficient for the research and optimization of the statistical models, it is clear that any inclusion of these models into real products will require very careful design of the data structures so that the final product can run on a standard personal computer equipped with a typical amount of main memory. Storage space can be saved at the cost of accuracy, for instance by ignoring tuples that appear only once or ignoring tuples that involve rare words. However, rare words or tuples do play an important role for the overall accuracy of such models and their omission leads to a significant reduction in model quality.

Presently, several techniques have been developed which can be used for encoding linguistic frequency data.

One of these technologies is the Xerox Finite-State Tool described in Lauri Karttunen, Tamás Gaál and André Kempe, "Xerox Finite-State Tool", Technical Report, Xerox Research Center Europe, Grenoble, France, June 1997. Xerox Finite-State Tool is a general-purpose utility for computing with finite-state networks. It enables the user to create simple automata and transducers from text and binary files, regular expressions and other networks by a variety of operations. A user can display, examine and modify the structure and the content of the networks. The result can be saved as text or binary files. The Xerox Finite-State Tool provides two alternative encodings, developed at XRCE (Xerox Research Center Europe) and at PARC (Xerox Palo Alto Research Center), the latter being based on the compression algorithm described in U.S. Pat. No. 5,450,598.

Another technique is the CMU/Cambridge Statistical Modeling toolkit described in Philip Clarkson and Ronald Rosenfeld, "Statistical Language Modeling Using the CMU-Cambridge Toolkit", Proceedings ESCA Euro Speech, 1997. The toolkit was released in order to facilitate the construction and testing of bigram and trigram language models.

For obtaining an exemplary, very large data set, 10,000,000 word trigram tokens from a technical domain were picked from the patent database of the European Patent Office. All non-alphanumeric characters were treated as token separators. In this example, a number of N=3,244,038 different trigram types could be identified. The overall vocabulary size, i.e. the number of different strings, was 49,177.

When encoding this data with the Xerox Finite-State Tool it could be compressed to a size of 4.627 bytes per entry in the file-based representation. However, if these data structures are loaded into memory they are expanded by a factor greater than 8, which renders the representation difficult to use in a large-scale setting.

The compressed representation based on the PARC encoding is loaded into memory and used as is, which renders it in principle more attractive for the run time. However, practical tests showed that the current implementation does not support data sets consisting of word trigrams taken from large corpora.

Finally, the CMU/Cambridge Statistical Language Modeling Toolkit stores information for the trigrams, which refer to the bigram information. Thus, the toolkit stores 996,766 bigrams and 3,244,035 trigrams (plus some additional information, such as smoothing parameters) into a binary representation that has 26,130,843 bytes. This means that, although the documentation states that eight bytes are required per bigram and four bytes per trigram, actually, 8 bytes are required for storing a trigram, and there is no appropriate way to use the toolkit to store only the trigram counts.

Thus, the XRCE representation obtained by the Xerox Finite-State Tool expands to large data structures when loaded into main memory. The PARC representation does not support very large networks, i.e. several millions of states and arcs. Finally, the CMU/Cambridge Language-Modeling toolkit requires effectively about eight bytes per trigram type. This means that the prior art technologies either do not support large-scale statistical language models, i.e. they do not scale up to the required amount of data, or they offer inferior compression.

SUMMARY OF THE INVENTION

Given the problems with the existing techniques, it would be advantageous to provide a method and system for encoding linguistic frequency data, and a method and system for accessing encoded linguistic frequency data, where the memory needed to store the encoded data is reduced without decreasing the level of linguistic quality.

It would be further advantageous to provide a compact representation of such information in a way that allows fast access to the frequency of a given tuple, that is to give better compression than the prior art techniques.

Moreover, it would be advantageous to provide an encoding method which can be operated on very large lists of word n-grams and can run on a standard PC equipped with a typical amount of main memory.

Furthermore, it would be advantageous to result in a lossless compression of linguistic frequency data in a way that facilitates access, in particular under circumstances in which the data do not change very often.

Further, it would be advantageous to provide an encoding mechanism of the data in a way that facilitates the look-up of a given tuple and accelerates the access.

Moreover, it would be advantageous to provide a system that, when operated in optical character recognition, achieves reduced error rates via context-aware decoding using statistical information on word co-occurrences.

The present invention has been made in the light of the above considerations and provides a method of encoding linguistic frequency data. A plurality of sets of character strings in a source text is identified. Each set comprises at least a first and a second character string. According to the method, frequency data indicative of the frequency of the respective set in the source text is obtained for each set. Then, for each character string that is a first character string in at least one of the sets, a memory position in a first memory array is assigned to the respective character string, and at this memory position the frequency data of each set comprising the respective character string as first character string is stored. Then, for each character string that is a second character string in at least one of the sets, a memory position in a second memory array is assigned to the respective character string. At this memory position, a pointer pointing to a memory position in the first memory array that has been assigned to the corresponding first character string of the respective set and which has stored the frequency data of the respective set, is stored for each set comprising the respective character string as second string.

The invention further provides a system for encoding linguistic frequency data. The system comprises a processing unit for identifying a plurality of sets of character strings in a source text, where each set comprises at least a first and a second character string. The processing unit is arranged for obtaining, for each set, frequency data indicative of the frequency of the respective set, and the source text. The system further comprises an encoder that, for each character string that is a first character string in at least one of the sets, assigns a memory position in a first memory array to the respective character string and stores at this memory position the frequency data of each set comprising the respective character string as first character string. The encoder is further arranged for assigning, for each character string that is a second character string in at least one of the sets, a memory position in a second memory array to the respective character string. Moreover, the encoder is arranged for storing at this memory position for each set comprising the respective character string as second character string, a pointer pointing to a memory position in the first memory array assigned to the corresponding first character string of the respective set and having stored the frequency data of the respective set.

The invention further provides a method of accessing encoded linguistic frequency data for retrieving the frequency of a search key in a text. The search key comprises a first and a second search string and the encoded data is stored in a first memory array which stores frequency data and in a second memory array which stores pointers to the first memory array. The frequency data is indicative of the frequencies of character sets in a source text. Each character set include at least two character strings. The method comprises identifying a region in the first memory array that is assigned to the first search string, and identifying a region in the second memory array that is assigned to the second search string. Then a pointer is identified that is stored in the region of the second memory array and that points to a memory position within the region of the first memory array. Then the frequency data stored at this memory position is read.

Further the invention provides a system for accessing encoded linguistic frequency data for retrieving the frequency of a search string in a text, where the search string comprises a first and a second search string. The encoded data is stored in a first memory array storing frequency data and a second memory array storing pointers to the first memory array. The frequency data is indicative of frequencies of character sets in a source text and each character set includes at least two character strings. The system comprises an input device for inputting the search key. Further, the system comprises a search engine for identifying a region in the first memory array that is assigned to the first search string and a region in the second memory array that is assigned to the second memory string. The search engine is further arranged for identifying a pointer stored in the region of the second memory array, where the pointer points to a memory position within the region of the first memory array. The search engine is further arranged to read the frequency data stored at this memory position.

BRIEF DESCRIPTION OF THE DRAWINGS

The accompanying drawings are incorporated into and form a part of the specification to illustrate the embodiments of the present invention. These drawings together with the description serve to explain the principles of the invention. The drawings are only for the purpose of illustrating alternative examples of how the invention can be made and used and are not to be construed as limiting the invention to only the illustrated and described embodiments. Further features and advantages will become apparent from the following and more particular description of the various embodiments of the invention as illustrated in the accompanying drawings, wherein.

DETAILED DESCRIPTION

Figure 1:
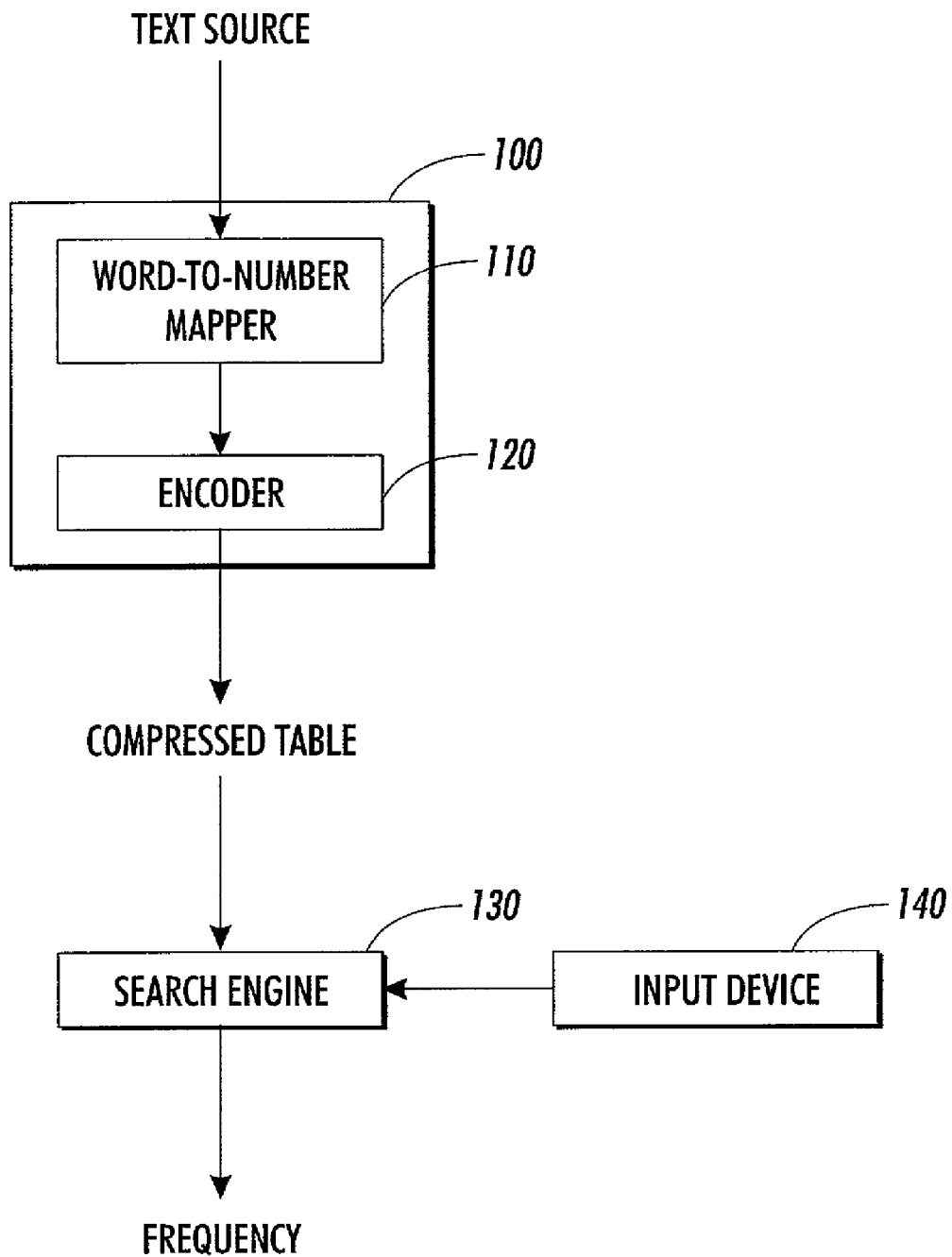
FIG. 1 illustrates a system for encoding linguistic frequency data and accessing such data, according to an embodiment of the present invention.

Referring now to the drawings and particularly to FIG. 1 which illustrates a system for encoding and accessing frequency data, the system comprises a processing unit 100 which includes a word-to-number mapper 110 and an encoder 120. It will be appreciated by those of ordinary skill in the art that the word-to-number mapper 110 and the encoder 120 may alternatively be comprised in separate processing units.

Unit 100 receives a source text which is, in the present embodiment, written in a natural language. The term "natural language" refers to any identified standard system of symbols used for human expression and communication, including systems, such as a dialect, vernacular, jargon, cant, argot or patois. Further, the term includes ancient languages, such as Latin, Ancient Greek and Ancient Hebrew, and also includes synthetic languages, such as Esperanto.

The source text may be taken from a corpus of related documents, e.g. in a certain technical domain, such as the automotive domain. The source text may include a number of separate documents which may be retrieved from databases, such as literature or patent databases.

The source text is received by word-to-number mapper 110 for mapping the words in the source text to unique numeric identifiers. The term "word" relates to any string of one or more characters and includes semantic units in the natural language, abbreviations, acronyms, contractions, etc. and further relates to single-character letters.

The word-to-number mapper 110 may make use of any suitable device, such as a hash-table. In another embodiment, word-number mapping implied by a finite-state machine with finite language is used, such as disclosed in U.S. Pat. No. 5,754,847, which is incorporated herein by reference.

The numeric identifiers are then used in the encoder 120 for generating a compressed table of encoded frequency data. The format of the encoded frequency data will be described below with reference to FIG. 2. The method of encoding the data will be described in more detail with reference to FIG. 3.

The encoded frequency data may then be used as input to a search engine 130 for retrieving the frequency of a search key in a text. A "search key" is a sequence of at least two search words or search strings and is input using an input device 140. The method operated by search engine 130 will be described in more detail below with reference to FIG. 4.

While in FIG. 1 the encoder and the search engine are depicted as being comprised in one and the same system. It will be appreciated by those of ordinary skill in the art that it is within the invention that the system for accessing the encoded linguistic frequency data may be separated from the system for encoding the data.

The systems may comprise a standard PC equipped with a typical amount of main memory.

Figure 2:
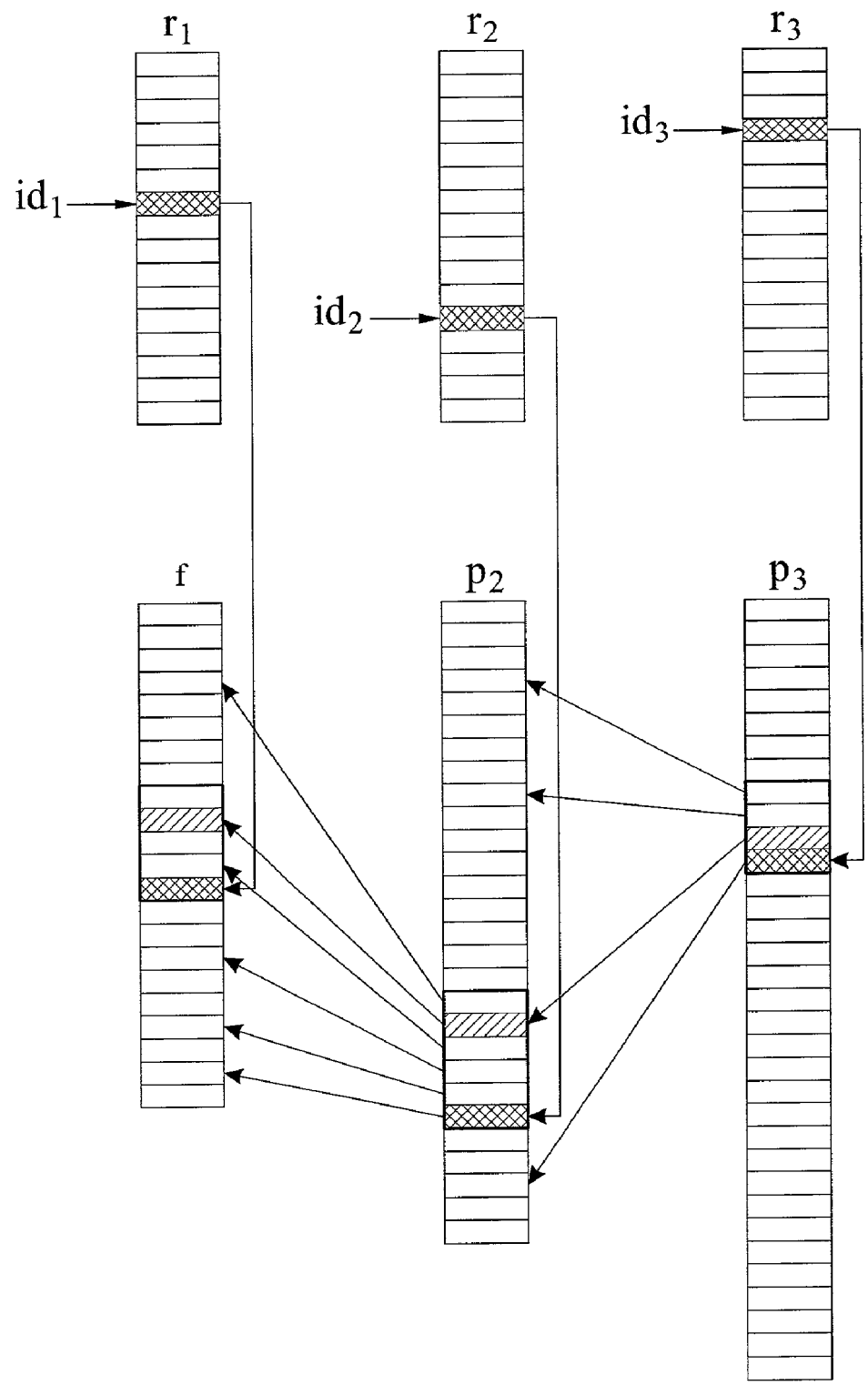
FIG. 2 illustrates the data structure according to an embodiment of the present invention.

Referring now to FIG. 2, the encoding scheme of the present invention will be described for the example of trigrams. It will however be appreciated that the invention is not restricted to trigrams, but may be used with other n-grams or any sets of character strings.

An "n-gram" usually means a series of n characters or character codes. A "trigram" is an n-gram with n=3. For example, the string "STRING" is parsed into the following letter trigrams: "STR", "TRI", "RIN" and "ING".

While in this example, a trigram refers to a string of three successive characters, the invention further relates to word trigrams, i.e. a sequence of three strings. For example, a frequent trigram in the automotive domain is "of the tire".

In the following, it might be assumed that a set of n-tuples of the form $<f, a_1, \ldots, a_n>$ is to be stored, where f are frequencies and $a_i$ are character strings in some suitable encoding.

The term "frequency" relates to the integer number of occurrences of the character strings or other data values from a finite domain of relatively small cardinality, such as probability estimates that are approximated with relatively low accuracy by rounding them to the closest value of $(1-\epsilon)^i$ for integer i. The term further includes feature weights of a maximum entropy model that are mapped to some discrete domain of low cardinality.

In the general case of n-tuples that are to be mapped into frequencies, there is according to the invention, one array f containing the frequencies and n−1 arrays $p_2 \ldots p_n$ containing pointers, such that the pointers in $p_2$ point to f, the pointers in $p_3$ point to $p_2$ and so on. Further, there are n arrays $r_1 \ldots r_n$, where $r_i$ contains offsets into the array $p_i$ for i>1 and into f for i=1. This is depicted in FIG. 2 for the example of n=3.

The arrays $r_i$ are each of size $id_{max}+1$ with $id_{max}$ being the maximum number of numeric identifiers id that have been mapped to the strings. The offsets in the arrays $r_i$ are memory positions in the respective arrays f or $p_i$ and can be understood as denoting intervals within the array they point to. These intervals or "blocks" range from $r_i[id]$ to $r_i[id+1]-1$, and can be thought of having the string attached, to which the numerical identifier id belongs. Hence, the entries in f implicitly specifies pairs of the form $<f, id_1>$, and the entries in $p_i$ specify tuples of the form $<f, id_1, \ldots, id_i>$.

In FIG. 2, an example of a trigram having the numeric identifiers $id_1$, $id_2$ and $id_3$ is shown. In the memory arrays f, $p_2$ and $p_3$, the blocks identified by the offsets $r_1[id_1]$, $r_2[id_2]$ and $r_3[id_3]$ are depicted. As the arrays $p_2$ and $p_3$ pointers to f and $p_2$ respectively, these pointers will in some cases point to memory locations within the respective block of the next array, but there may also be pointers that point to memory locations outside the respective block. For each tuple, there is only one chain of memory positions which then uniquely defines the tuple. For the example of $<f, id_1, id_2, id_3>$, this is shown in FIG. 2 by hatching the respective memory positions.

In the present embodiment, the entries of the arrays $p_i$ are sorted within each block $r_i[id] \ldots r_i[id+1]-1$ with respect to the addresses they contain. Thus, the addresses that belong to a block of pointers, i.e. which are annotated with the same numeric identifier, are strictly monotonically increasing. This can be seen in FIG. 2 from the fact that there is no arrow pointing from $p_3$ to $p_2$ or from $p_2$ to f, crossing with each other.

Assuming that N tuples of the form $<f, a_1, \ldots, a_n>$ are to be stored, there are N different entries in the array $p_n$, or $p_3$ in the example of FIG. 2. The arrays $p_i$ with i<n, and array f, are of smaller length, since the information stored in these arrays may be used multiple times. For example, given the trigrams "of the wiper" and "of the door" and assuming that these trigrams have equal frequencies, both trigrams have equal $<f, id_1, id_2>$ as $id_1$ is the numeric identifier identifying the string "of", and $id_2$ is the numeric identifier identifying "the". Thus, when storing the tuples of these trigrams using the data structure of the present invention, there are separate entries in $p_3$ for $id_3=$"wiper" and $id_3=$"door", but the pointers stored at the respective separate positions in $p_3$ point to the same location in $p_2$. That is, the invention allows for re-using shorter tuples multiple times thereby exploiting common parts of different trigrams. This leads to a more compact encoding without reducing the access time.

Figure 3:
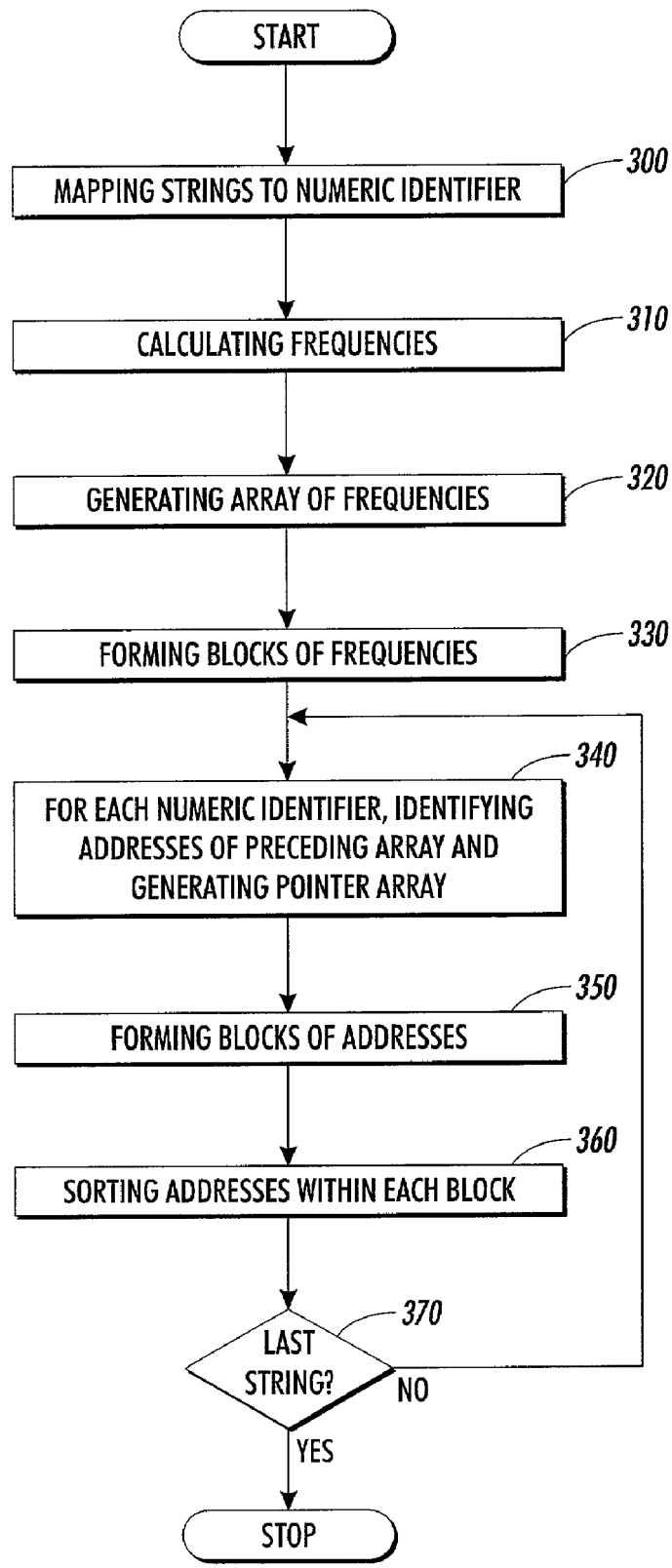
FIG. 3 is a flowchart illustrating the method of encoding linguistic frequency data according to an embodiment of the present invention.

The method of encoding the frequency data will now be described in more detail with reference to FIG. 3. In step 300, numeric identifiers are mapped to the strings in the source text. Then the frequencies of the n-grams are calculated in step 310. As already mentioned above, frequencies may be counts of the n-grams or other lexical co-occurrence counts including statistical indicators, such as weights of a maximum entropy model. Then the frequencies are stored in the array f, and blocks are formed such that the frequencies relating to n-grams which have the same first string are grouped together (steps 320 and 330). Then for each string $i=2\ldots n$, the steps 340–360 are performed, that is, a pointer array is generated storing pointers which are grouped into blocks and which have the addresses within each block sorted.

Figure 4:
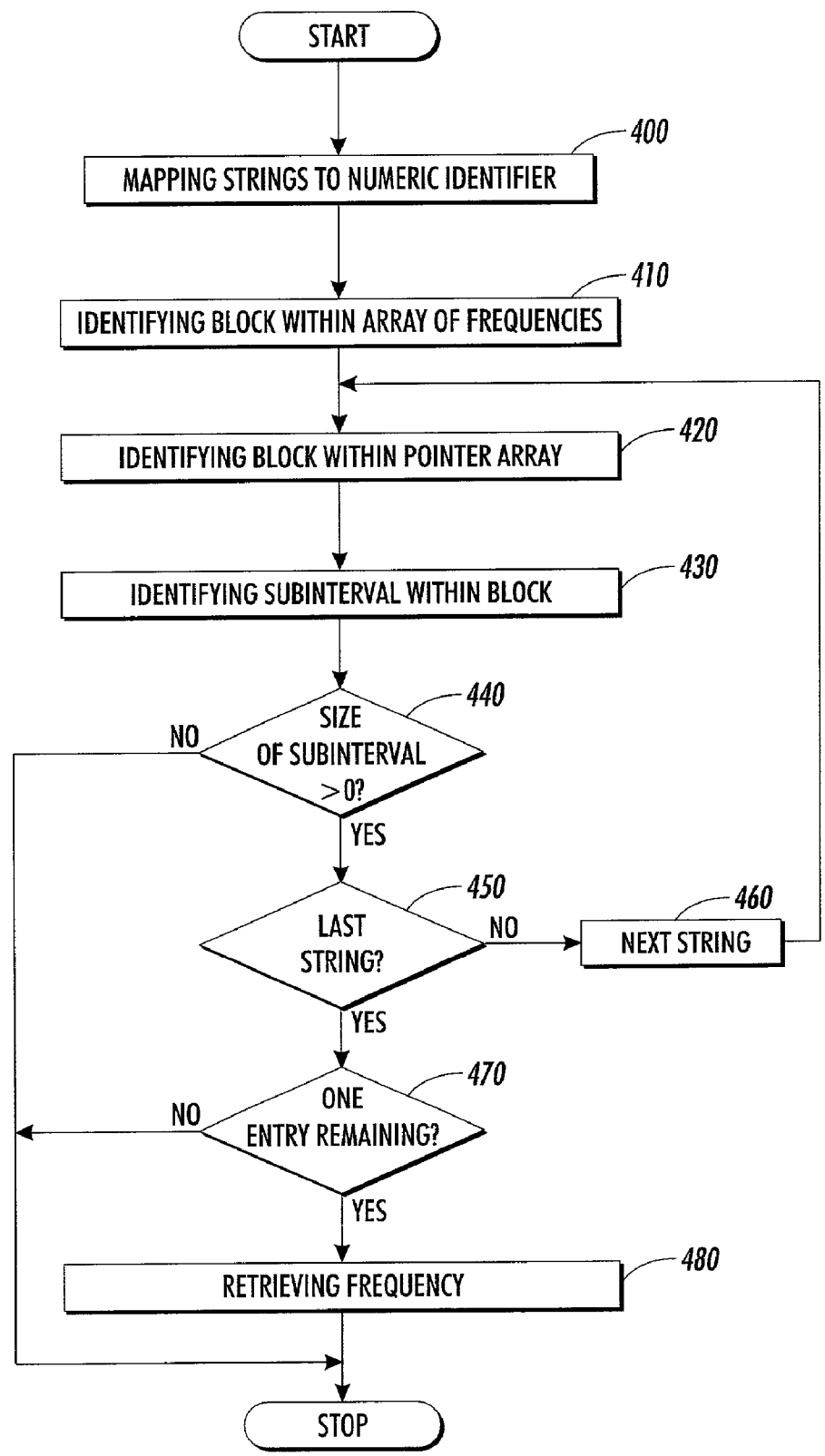
FIG. 4 is a flowchart illustrating the method of accessing encoded linguistic frequency data according to an embodiment of the present invention.

FIG. 4 illustrates an embodiment of a process of looking up an entry in the compressed table, i.e. accessing a frequency from the encoded data. First, the strings contained in the search key $<a_1, \ldots, a_n>$ are converted to a tuple $<id_1, \ldots, id_n>$ in step 400, for instance using a hash-table or word-to-number mapping as described above. Then an interval within the array f is identified by looking up the block boundaries in $r_1[id_1]$ and $r_1[id_1+1]$ (step 410). Then for each $i=2\ldots n$, the block boundaries $r_i[id_i]$ and $r_i[id_i+1]$ are looked up to obtain the interval within the array $p_i$ (step 420). In step 430, the subinterval for which the pointers point into the given region of the previous array $p_{i-1}$ (or f) is identified by performing a binary search for both ends of that interval. Whenever this reduces the size of the interval to 0, the process can be stopped immediately (step 470), as no tuple in the representation is compatible with a given sub-tuple $<a_1, \ldots, a_i>$. When the last string has been processed (steps 450, 460), i.e. i=n, either 0 or 1 entries are identified. The required frequency can then be retrieved in step 480 by tracing back the pointers for this entry through the arrays $p_i$ until the array f is reached.

Figure 5:
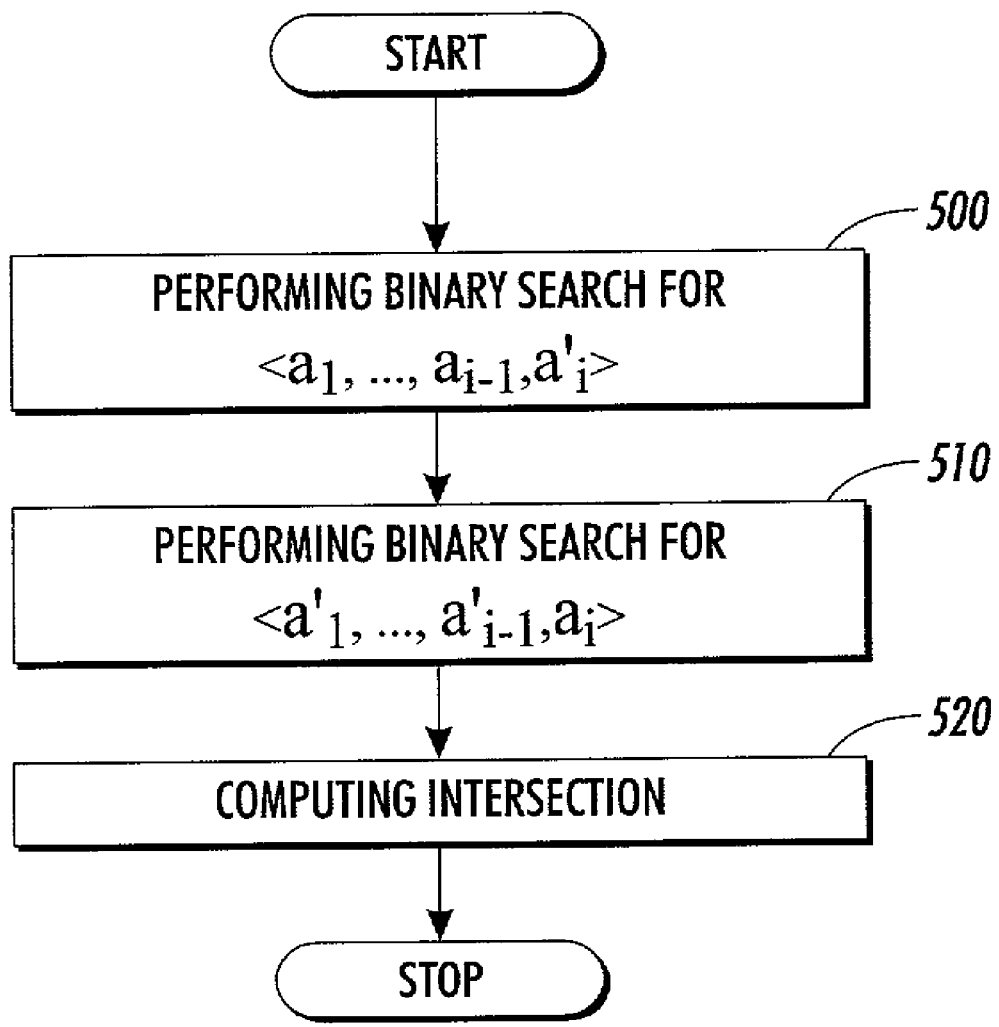
FIG. 5 is a flowchart illustrating the substep of identifying a subinterval within a block, performed in the method of FIG. 4.
Figure 6:
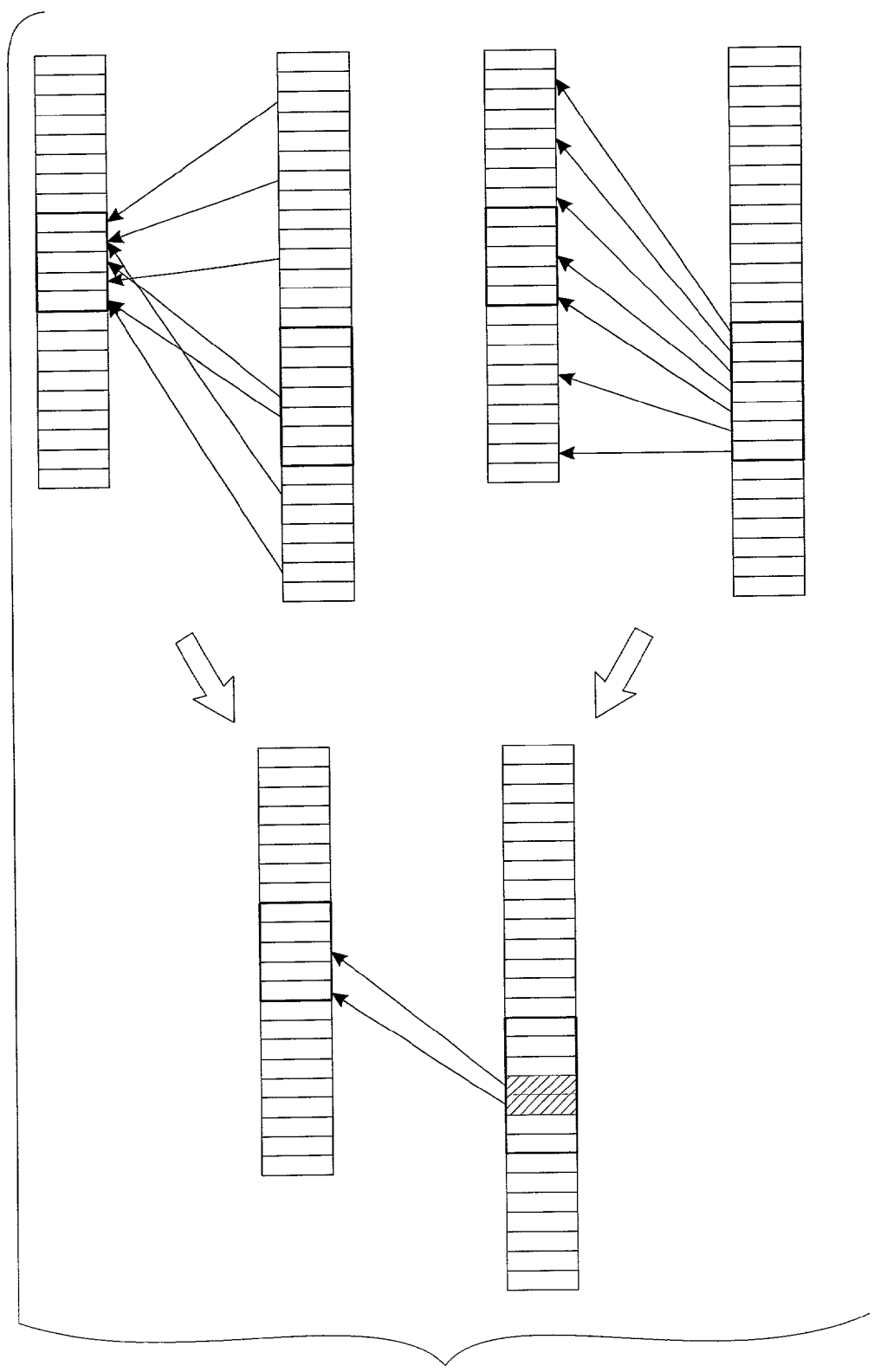
FIG. 6 illustrates the concept behind the process depicted in FIG. 5.

The concept of identifying a subinterval (step 430) is illustrated in FIG. 5 in more detail. For each i, the set of partial tuples $<a_1, \ldots, a_{i-1}, a'_i>$ that matches the search key $<a_1, \ldots, a_n>$ up to the component $a_{i-1}$ is intersected with the set of partial tuples $<a'_1, \ldots, a'_{i-1}, a_i 22$ that matches the i-th component. Each such intersection can be done by performing binary searches (steps 500 and 510) and computing the intersection in step 520 that results in an interval of reduced size. This concept is illustrated in FIG. 6, where in the upper portion the sets of pointers according to both binary searches are depicted which are then combined as shown in the lower portion of the drawing to identify the subinterval.

For some applications, it may be useful to look up and enumerate all entries that are compatible with an incompletely specified tuple. This can be done in a straight forward way, when some prefix of the tuple components $a_1, \ldots a_i$ are to be ignored. In this case, the access method according to the present invention described above can be started by looking up the first available component in its corresponding array and proceeding up to $a_n$. This may lead to a longer interval of compatible entries, which can be enumerated in a straightforward way. However, if matching of partial tuples is needed and non-initial components are missing from the search tuple, the order of the components needs to be arranged such that the potentially missing components appear first.

According to an embodiment of the present invention, the arrays $p_i$ are stored in a compressed form. This can be done, for instance, by replacing the addresses by the size of the gaps between adjacent addresses, exploiting the fact that short gaps are much more likely than long ones, and using some optimized encoding such as Huffman encoding or encodings based on global, local or skewed variants of the Bernoulli model or hyperbolic model. Using arithmetic coding, a selection of k-out-of-$N_{n-1}$ possible target addresses can be stored in the information-theoretic limit of $\lceil \log_2$ $$\left\lceil \log_2 \binom{N_{n-1}}{k} \right\rceil$$

] bits. For example, as array $p_n$ is larger than the others, and it typically also contains longer addresses, only array $p_n$ may be compressed.

As shown above, the invention provides better compression by exploiting common parts of tuples when storing the encoded data. This will now be discussed in more detail with reference to the above numeric example of 10,000,000 word trigram tokens which were picked from a technical domain.

In this example, the value of $id_{max}$ was 49,177, and there were 147,650 different pairs $<f, id_1>$ and 1,479,809 different tuples $<f, id_1, id_2>$. This leads to a memory consumption of $3*(49,177+1)+147,650+1,479,809+3,244,038=5,019,031$ memory cells for storing the three arrays $r_i$ and f, $p_1$ and $p_2$.

To get a more detailed value of the memory consumption, the number of bits needed for the addresses in the various arrays can be calculated. A pointer to the array f requires $\lceil \log_2(147650) \rceil = 18$ bits, a pointer to $p_2$ needs $\lceil \log_2(1479809) \rceil = 21$ bits, and a pointer to $p_3$ needs $\lceil \log_2(3244038) \rceil = 22$ bits. As in the present example the highest frequency was 29,179, 15 bits suffice to store the frequencies in array f. This leads to a memory consumption of $(49,177+1)*(18+21+22)+147650*15+1,479,809*18+3,244,038*21$ bits=12,496,996 bytes.

Additionally, some space is needed for storing the word-to-number mapping from the strings to the numeric identifiers. As the vocabulary can be encoded in a finite-state network having 32,325 states and 65,558 arcs, a complete word-to-number mapping can be encoded in less than 260 kB.

To show that the encoding scheme of the present invention leads to a significantly reduced memory consumption, the above numbers will now be compared to the results of straightforward encoding methods, one based on a plain ASCII representation, and the second based on mapping from component strings to unique numerical identifiers.

Using an ASCII encoding and suitable separator characters, the memory consumption amounts to $4*3,244,038=12,976,152$ memory cells, which is significantly larger than the value of 5,019,031 obtained by the present invention. Larger collections will typically lead to even more drastic savings.

When using about two bytes for storing each frequency (almost all of the numbers fit into one byte, plus a separator), and using about six bytes on average (also including separators) for storing the strings themselves, about 20 bytes per entry are needed. This leads to 65,122,473 bytes, which is again much more than the value of 12,496,996 bytes that are needed according to the present invention.

Thus, compared with the method of the present invention, the straightforward ASCII encoding is not only redundant, but also makes the lookup of a given tuple rather difficult. In contrast thereto, the invention allows for encoding the same data in much less space, and at the same time, provides means to access a given tuple quickly.

Another straightforward, slightly improved encoding would be to map the strings to unique numeric identifiers when storing the frequency data. If a constant amount of memory is used for the numeric identifiers and for the frequencies, this allows random access to any entry which is specified by its position.

The overall memory requirement is $N*(n+1)+M_{dict}$ memory cells, assuming a memory cell can hold the identifier for a string or a frequency, where $M_{dict}$ is the number of memory cells needed to store the mapping between strings and identifiers. In the above example, ignoring $M_{dict}$, the memory consumption would again be 4*3,244,038=12,976,152 memory cells, which is much larger than required according to the present invention.

As shown above, the invention provides a technique for a compact representation of linguistic frequency data which may be useful in stochastic language models or as a module within a syntactic parser that uses lexicalized models of attachment probabilities. The compact representation of such information is achieved in a way that allows fast access to the frequency of a given tuple, which is a crucial component of large-scale statistical language models.

While the invention has been described with respect to the physical embodiments constructed in accordance therewith. It will be apparent to those skilled in the art that various modifications, variations and improvements of the present invention may be made in the light of the above teachings and within the purview of the appended claims without departing from the spirit and intended scope of the invention. For instance, it will be appreciated that the invention can easily be adapted to store symbolic information, e.g. if the range is of a small cardinality, such as for verb subcategorization frames.

In addition, those areas, in which it is believed that those of ordinary skill in the art are familiar, have not been described herein in order not to obscure unnecessarily the invention described herein. Accordingly, it is to be understood that the invention is not to be limited by the specific illustrated embodiments, but only by the scope of the appended claims.

What is claimed is:

1. Method of encoding linguistic frequency data, the method comprising:
   mapping each character string occurring in a source text to a numeric identifier identifying the character string,
   identifying a plurality of sets of n character strings in a source text, n being an integer number greater than 1, each set forming an n-gram comprising at least a first and a second successive character string,
   for each set, obtaining frequency data indicative of the frequency of the respective set in the source text,
   creating a memory array f for containing the frequency data, n−1 pointer memory arrays $p_2 \ldots p_n$ for containing pointers, and n offset positional arrays $r_1$–$r_n$ for containing indexing offsets,
   for each character string that is a first character string in at least one of the sets, assigning a memory position in memory array f to the respective character string and storing at said memory position the frequency data of each set comprising the respective character string as the first character string,
   grouping the frequencies relating to n-grams that have the same first character string into a block within the array f,
   for each character string that is a second character string in at least one of the sets, assigning a memory position in pointer memory array $p_2$ to the respective character string and storing at said memory position, for each set comprising the respective character string as the second character string, a pointer pointing to a memory position in the memory array f assigned to the corresponding first character string of the respective set and having stored the frequency data of the respective set,
   grouping the pointers relating to n-grams that have the same second character string together as a block within the pointer memory array $p_2$,
   storing an offset position for each respective first character string in positional array $r_1$ that indexes to the corresponding block in frequency array f relating to the first character string, and
   storing an offset position for each respective $i^{th}$ character string in positional array $r_i$ that indexes to the corresponding block in pointer array $p_i$ relating to the $i^{th}$ character string.

2. The method of claim 1 wherein each set of character strings further comprises an $i^{th}$ character string, where i=3 . . . n, and the method further comprises:
   for each character string that is an $i^{th}$ character string in at least one of the sets, assigning a memory position in an $i^{th}$ pointer memory array $p_i$ to the respective character string and storing at said memory position, for each set comprising the respective character string as the $i^{th}$ character string, a pointer pointing to a memory position in the memory array $p_{i-1}$ assigned to the corresponding $i^{th}$−1 character string of the respective set.

3. The method of claim 1 wherein each character string is a word of a natural language.

4. The method of claim 1 wherein n is equal to 3, the n-grams being trigrams.

5. The method of claim 1 wherein said frequency data indicative of the frequency of the respective set in the source text includes the number of occurrences of the respective set in the source text.

6. The method of claim 1 wherein said frequency data indicative of the frequency of the respective set in the source text includes weight numbers of a maximum entropy model.

7. The method of claim 1, further comprising:
   mapping each character string occurring in the source text to a numeric identifier identifying the character string, by operating a finite-state machine.

8. The method of claim 1, further comprising:
   accessing a hash-table for assigning a numeric identifier to each character string occurring in the source text.

9. The method of claim 1, further comprising:
   in the second memory array, sorting the pointers relating to the same second character string, with respect to the memory positions of the first memory array to which the pointers point.

10. The method of claim 1 wherein the pointers are stored in compressed form.

11. Method of accessing encoded linguistic frequency data for retrieving the frequency of a search key in a text encoded according to the method of claim 1, the search key comprising a first and a second search string, the encoded data being stored in array f storing frequency data and memory array $p_2$ storing pointers to the array f, the frequency data being indicative of the frequencies of character sets in the source text, the character sets each including at least two character strings, the method comprising:

identifying a block in the array f that is assigned to the first search string, identifying a block in the array $p_2$ that is assigned to the second search string, identifying a pointer stored in the block of the array $p_2$, pointing to a memory position within the block of the array f, and reading the frequency data stored at said memory position.

12. The method of claim 11 wherein the search key further comprises a third search string and the encoded data is further stored in a memory array $p_3$ storing pointers to the array $p_2$, wherein the method further comprises:

identifying a block in the array $p_3$ that is assigned to the third search string, identifying a pointer stored in the block of the array $p_3$, pointing to a memory position within the block of the array $p_2$, and tracing the pointer stored in the block of the array $p_3$ back until the block of the array f is reached.

13. The method of claim 11 wherein each character string is a word of a natural language.

14. The method of claim 11 wherein each set of character strings comprising n character strings, n being an integer number greater than one, each set being an n-gram.

15. The method of claim 11 wherein n is equal to 3, the n-grams being trigrams.

16. The method of claim 11 wherein said frequency data indicative of the frequency of the respective set in the source text includes the number of occurrences of the respective set in the source text.

17. The method of claim 11 wherein said frequency data indicative of the frequency of the respective set in the source text includes weight numbers of a maximum entropy model.

18. The method of claim 11 wherein identifying a pointer includes performing a binary search within the second memory array.

19. The method of claim 11 wherein identifying a pointer includes identifying a sub-interval in the block of the memory array $p_2$, the sub-interval including at least two pointers pointing to a memory position within the block of the array f.

20. The method of claim 11, wherein identifying a pointer includes performing a first binary search for a set of pairs of strings where the first string in each pair matches the first search string, performing a second binary search for a set of pairs of strings where the second string in each pair matches the second search string, and calculating an intersection of both sets.

21. The method of claim 11, further comprising:

if the character sets in the source text comprise more character strings than the search key and if potentially missing search strings exist, arranging the search strings in the search key such that the potentially missing search strings appear first.

22. A system for encoding linguistic frequency data, comprising:

a processing unit for identifying a plurality of sets of character strings in a source text, each set comprising an n-gram including at least a first and a second character string, and, for each set, obtaining frequency data indicative of the frequency of the respective set in the source text, and an encoder that:

creates a memory array f for containing the frequency data, n−1 pointer memory arrays $p_2 \ldots p_n$ for containing pointers, and n offset positional arrays $r_1$–$r_n$ for containing indexing offsets, for each character string that is a first character string in at least one of the sets, assigns a memory position in memory array f to the respective character string and stores at said memory position the frequency data of each set comprising the respective character string as the first character string, groups the frequencies relating to n-grams that have the same first character string into a block within the array f, for each character string that is a second character string in at least one of the sets, assigns a memory position in pointer memory array $p_2$ to the respective character string and stores at said memory position, for each set comprising the respective character string as second character string, a pointer pointing to a memory position in the memory array f assigned to the corresponding first character string of the respective set and having stored the frequency data of the respective set, groups the pointers relating to n-grams that have the same second character string together as a block within the pointer memory array $p_2$, stores an offset position for each respective first character string in positional array $r_1$ that indexes to the corresponding block in frequency array f relating to the first character string, and stores an offset position for each respective $i^{th}$ character string in positional array $r_i$ that indexes to the corresponding block in pointer array $p_i$ relating to the $I^{th}$ character string.

23. A system for accessing encoded linguistic frequency data encoded by the system of claim 22 for retrieving the frequency of a search key in a text, the search key comprising a first and a second search string, the encoded data being stored in an array f storing frequency data and at least one array $p_2$ storing pointers back to the array f, the frequency data being indicative of the frequencies of character sets in a source text, the character sets each including at least two character strings, the system comprising:

an input device for inputting the search key, and a search engine for identifying a block in the array f that is assigned to the first search string, identifying a block in the array $p_2$ that is assigned to the second search string, identifying a pointer stored in the block of the array $p_2$, the pointer pointing to a memory position within the block of the array f, and reading the frequency data stored at said memory position.

24. Method of encoding linguistic frequency data, the method comprising:

mapping each character string occurring in a source text to a numeric identifier identifying the character string, identifying a plurality of sets of n character strings in a source text, n being an integer number of at least 3, each set forming an n-gram comprising at least a first, a second and a third successive character string, for each set, obtaining frequency data indicative of the frequency of the respective set in the source text, creating a memory array f for containing the frequency data, and n−1 pointer memory arrays $p_2 \ldots p_n$ for containing pointers, and n offset positional arrays $r_1$–$r_n$ for containing indexing offsets, for each character string that is a first character string in at least one of the sets, assigning a memory position in memory array f to the respective character string and storing at said memory position the frequency data of each set comprising the respective character string as the first character string, for each character string that is a second character string in at least one of the sets, assigning a memory position in pointer memory array $p_2$ to the respective character string and storing at said memory position, for each set comprising the respective character string as the second character string, a pointer pointing to a memory position in the memory array f assigned to the corresponding first character string of the respective set and having stored the frequency data of the respective set, and for each character string that is an $i^{th}$ character string in at least one of the sets, for i=3 . . . n, assigning a memory position in an $i^{th}$ pointer memory array $p_i$ to the respective character string and storing at said memory position, for each set comprising the respective character string as the $i^{th}$ character string, a pointer pointing to a memory position in the memory array $p_{i-1}$ assigned to the corresponding $i^{th}$–1 character string of the respective set, wherein multiple pointers in the $i^{th}$ pointer memory array $p_i$ point to the same memory position within memory array $p_{i-1}$ and only one chain of memory positions within f, $p_2$ . . . $p_n$ uniquely define each n-gram.

* * * * *